United States Patent [19]

Eady

[11] Patent Number: 5,634,391
[45] Date of Patent: Jun. 3, 1997

[54] INERT PLASTIC COATED FLEXIBLE TYPE DIAPHRAGM FOR APPLICATION IN A SANITARY TYPE PUMP

[75] Inventor: Eldon S. Eady, Greensburg, Pa.

[73] Assignee: Westinghouse Air Brake Co., Wilmerding, Pa.

[21] Appl. No.: 677,098

[22] Filed: Jul. 9, 1996

[51] Int. Cl.$^6$ ........................................ F01B 19/00
[52] U.S. Cl. .................. 92/97; 92/98 R; 92/99; 92/103 F
[58] Field of Search .................. 92/96, 98 R, 99, 92/102, 103 R, 103 F, 105, 97

[56] References Cited

U.S. PATENT DOCUMENTS

| | | | |
|---|---|---|---|
| 2,840,339 | 6/1958 | Price | 92/97 |
| 2,947,325 | 8/1960 | McFarland, Jr. | 92/103 F |
| 3,208,721 | 9/1965 | McHugh | 92/99 |
| 3,282,171 | 11/1966 | Tuckmantel | 92/99 |
| 3,613,518 | 10/1971 | Prosser | 92/98 R |
| 3,950,996 | 4/1976 | Lewis | 92/98 R |
| 5,052,276 | 10/1991 | Halsey | 92/103 F |

FOREIGN PATENT DOCUMENTS

| | | | |
|---|---|---|---|
| 2452748 | 5/1976 | Germany | 92/99 |
| 539401 | 2/1956 | Italy | 92/103 R |

Primary Examiner—Thomas E. Denion
Attorney, Agent, or Firm—James Ray & Associates

[57] ABSTRACT

Inert plastic coated flexible diaphragm for sanitary pump applications includes a first body portion, disposed in center of diaphragm, which is relatively thick and exhibits a first degree of flexibility. A second body portion is formed contiguously with the first body portion and extends around periphery thereof. The second body portion is relatively thin, compared to the first body portion, and exhibits a second degree of flexibility greater than the first degree of flexibility. A sealing bead-like member is formed contiguously with such second body portion and extends around periphery thereof for sealing the flexible diaphragm in an operating position within a housing portion of such pump. A flexible plastic layer is adhered to each surface of the first body portion, the second body portion and such sealing bead-like member which will come into intimate contact with a material to be pumped. Such plastic layer having a substantially uniform thickness. An insert member is embedded within the first body portion to enable the inert plastic coated flexible type diaphragm to be connected to a rod-like piston member disposed for reciprocal movement within such pump.

21 Claims, 3 Drawing Sheets

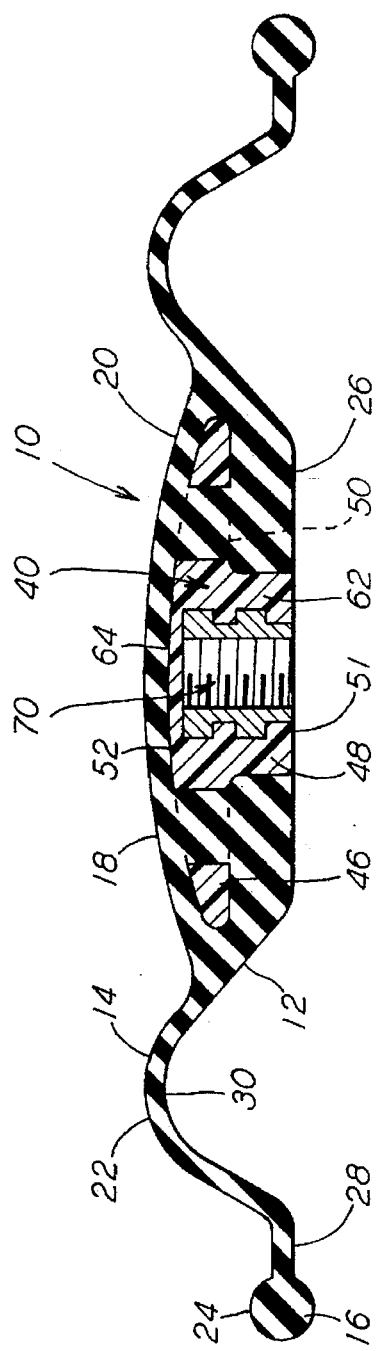
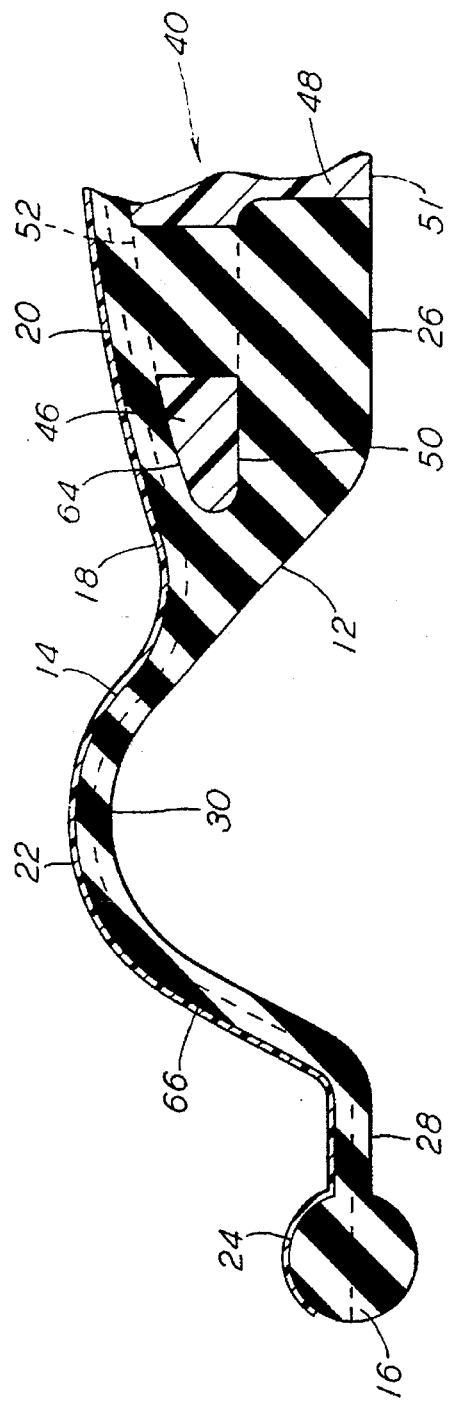

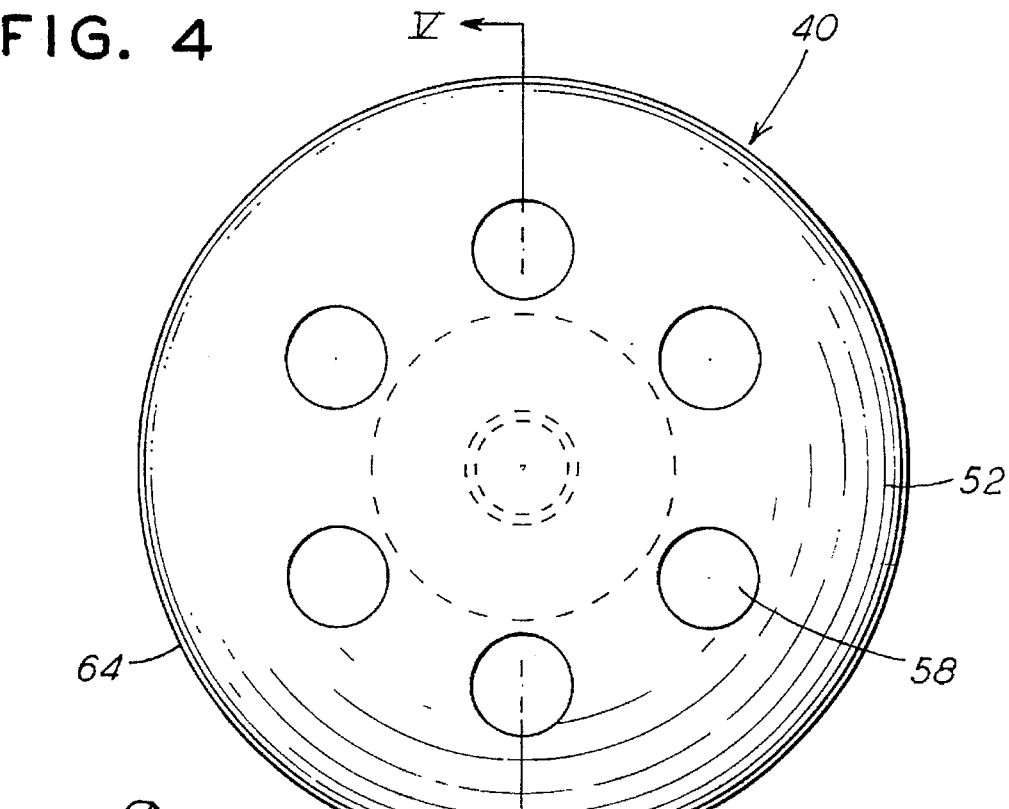
FIG. 4
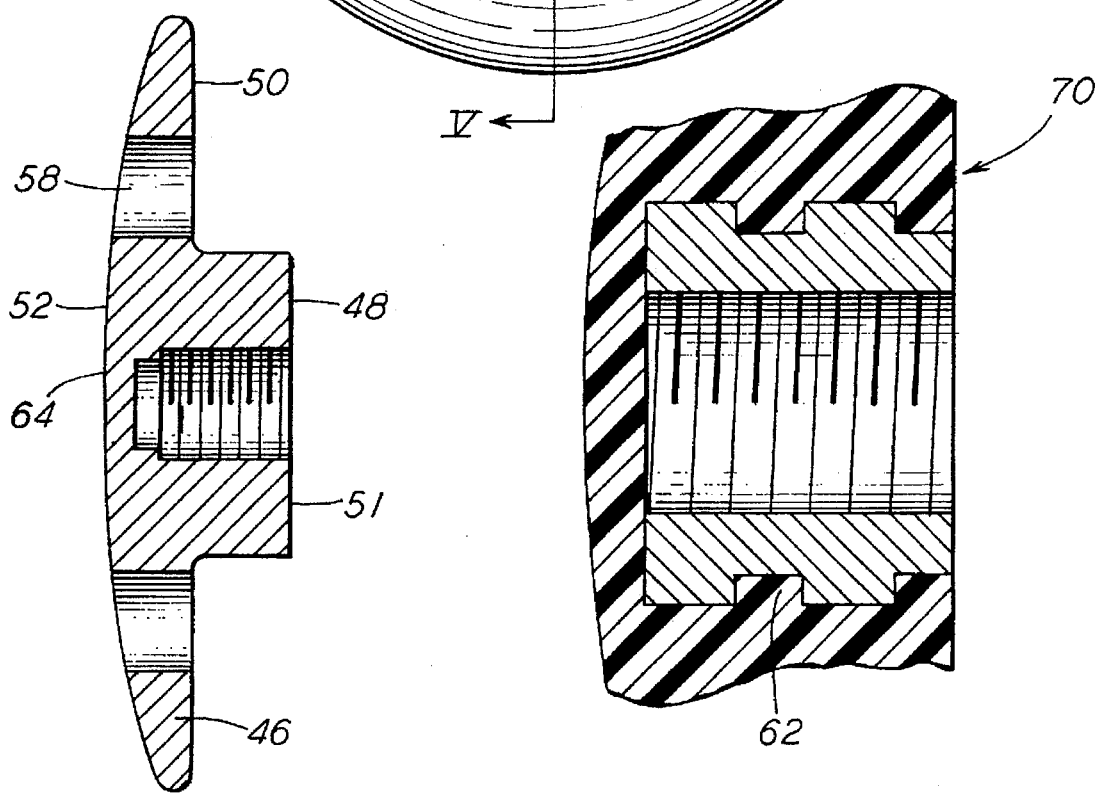
FIG. 5
FIG. 6

INERT PLASTIC COATED FLEXIBLE TYPE DIAPHRAGM FOR APPLICATION IN A SANITARY TYPE PUMP

CROSS REFERENCE TO RELATED APPLICATIONS

The invention taught in this patent application is closely related to the invention taught in my earlier filed co-pending patent application titled, "ABRASION RESISTANT PLASTIC BONDED TO A FLEXIBLE DIAPHRAGM" which was filed on May 6, 1996 and assigned Ser. No. 08/643,604. Additionally, the invention taught in this patent application is closely related to the invention taught in my co-pending patent application titled "IMPROVED INSERT TYPE MEMBER FOR USE IN A FLEXIBLE TYPE PUMP DIAPHRAGM" which is being filed concurrently herewith. Each of the above referenced patent applications is assigned to the same assignee as the present application. In addition, the teachings in each of these above referenced co-pending patent applications are incorporated herein by reference thereto.

FIELD OF THE INVENTION

The present invention relates, in general, to flexible type diaphragms that are presently being utilized in a large number of sanitary type pumping applications and, more particularly, the instant invention relates to an improved inert plastic coated flexible type diaphragm for use in a sanitary type pump application in which substantially the entire surface area of such flexible type diaphragm that will become exposed to a preselected type material to be pumped is covered with such inert plastic in order to thereby either completely eliminate or to at least substantially minimize any possible undesirable known types of contamination of such preselected type material that is to be pumped as well as any exposed surface areas where certain known detrimental types of bacteria could possibly begin to grow.

BACKGROUND OF THE INVENTION

Prior to the conception and subsequent development of the present invention, as is generally well recognized in the prior art, flexible type diaphragms are a necessary integral component in a variety of piston type pumps.

To the best of applicant's knowledge, each of these prior art flexible type diaphragms has been secured to one end of a rod-like piston member that is positioned within the pump housing where it is connected for reciprocal movement. A portion of a metallic flange-like member is inserted through an aperture that is disposed in the geometric center of such flexible type diaphragm member and then bolted to such rod-like piston member to secure such flexible type diaphragm into an operating position.

As can best be seen in FIG. 1, which has been labeled prior art in the attached drawings, this flange-like member has a relatively large metal surface area that has always been exposed to the particular material to be pumped. This exposed relatively large metal surface area is known to be a source of undesirable contamination as well as a likely location where detrimental type bacteria can grow.

Consequently, in certain well known and extremely critical type applications which require sanitary type conditions, such as usage in either the food industry or in the medical field, it has been the common practice for stainless type steels to be used in the production of the flange-like member to be used to secure the flexible type diaphragm to such rod-like piston member. Even though these stainless type steels can be produced to rather exacting standards they still exhibit a number of significant problems in their use in these highly critical sanitary type applications.

One such problem, for example, is that it does not completely eliminate sites where such detrimental type bacteria can start to grow because there are still crevices where the flange-like member is attached to the flexible type diaphragm. A second significant problem is associated with cleaning these prior art flexible type diaphragms between uses. In addition, the use of stainless steel to produce these flange-like members is rather expensive in comparison to either cast iron or plastic, for example.

Applicant is aware of, and has been involved in, a number of previous attempts to incorporate an insert type member into the back portion of these flexible type diaphragms in order to have a substantially uniform non-obtrusive surface area which will be in contact with the particular material to be pumped. One such prior attempt, for example, involved the addition of an extra layer of relatively expensive nylon type reinforcement to the flexible type diaphragm.

However, each of these prior attempts was unsuccessful. The primary reason why these prior attempts were unsuccessful was the fact that these insert type members could be pulled out of such flexible type diaphragm with relative ease due to the necessary reciprocal pumping action of the rod-like piston member. When this situation occurs the pump is then left in a broken and unusable condition.

SUMMARY OF THE INVENTION

The present invention provides an inert plastic coated flexible type diaphragm. Such inert plastic coated flexible type diaphragm being specifically design for utilization in a sanitary type pump application. This inert plastic coated flexible type diaphragm includes a first body portion disposed substantially in a center portion of such flexible type diaphragm. The first body portion is relatively thick and will exhibit a first degree of flexibility. Such first body portion has a first predetermined shape. There is a second body portion formed contiguously with the first body portion which extends around a periphery thereof. This second body portion is relatively thin in comparison to such first body portion and it exhibits a second degree of flexibility which is greater than such first degree of flexibility of the first body portion. Such second body portion has a second predetermined shape. A sealing means is formed contiguously with the second body portion and extends around a periphery thereof in order to seal such flexible type diaphragm in an operating position within a housing portion of such pump. This sealing means has a third predetermined shape. There is a flexible type preselected plastic layer adhered to each surface of such first body portion and the second body portion and such sealing means which will come into intimate contact with a preselected type material to be pumped. The preselected plastic layer exhibits a substantially uniform predetermined thickness. The final essential component of the flexible type diaphragm is an insert type member embedded within the first body portion to enable such inert plastic coated flexible type diaphragm to be connected to a piston rod-like member disposed for reciprocal movement within such pump.

OBJECTS OF THE INVENTION

It is, therefore, one of the primary objects of the present invention to provide an inert plastic coated flexible type diaphragm having an insert type member to which a rod-like piston member can be attached and which can be molded into the body portion of such inert plastic coated flexible type diaphragm in order to provide a substantially non-obtrusive surface area that will be in intimate contact with the fluid and/or other type predetermined type materials to be pumped.

It is an additional object of the present invention to provide an inert plastic coated flexible type diaphragm having an insert type member to which a rod-like piston member can be attached and which can be molded into the body portion of such inert plastic coated flexible type diaphragm in a manner such that the piston forces being exerted on such insert type member would not release it from such inert plastic coated flexible type diaphragm.

Another object of the present invention is to provide an inert plastic coated flexible type diaphragm having an insert type member to which a rod-like piston member can be attached and which can be molded into the body portion of such inert plastic coated flexible type diaphragm in a manner such that a side of such inert plastic coated flexible type diaphragm disposed directly opposite such insert type member can be a substantially continuous piece of a preselected chemically inert type plastic material.

Still another object of the present invention is to provide an inert plastic coated flexible type diaphragm having an insert type member to which a rod-like piston member can be attached and which can be molded into the body portion of such inert plastic coated flexible type diaphragm that is cost effective in critical type pump applications.

Yet another object of the present invention is to provide an inert plastic coated flexible type diaphragm having an insert type member to which a rod-like piston member can be attached and which can be molded into the body portion of such inert plastic coated flexible type diaphragm which will significantly reduce the maintenance requirements for pumps equipped with such inert plastic coated flexible type diaphragm.

A further object of the present invention is to provide an inert plastic coated flexible type diaphragm having an insert type member to which a rod-like piston member can be attached and which can be molded into the body portion of such inert plastic coated flexible type diaphragm which will significantly reduce the downtime for pumps equipped with such inert plastic coated flexible type diaphragm.

Another object of the present invention is to provide an inert plastic coated flexible type diaphragm having an insert type member to which a rod-like piston member can be attached and which can be molded into the body portion of such inert plastic coated flexible type diaphragm which is relatively easy to replace when necessary.

A still further object of the present invention is to provide an inert plastic coated flexible type diaphragm having an insert type member to which a rod-like piston member can be attached and which can be molded into the body portion of such inert plastic coated flexible type diaphragm which is easy to clean between uses.

Yet another object of the present invention is to provide an inert plastic coated flexible type diaphragm having an insert type member to which a rod-like piston member can be attached and which can be molded into the body portion of such inert plastic coated flexible type diaphragm which can be custom designed for a particular end use.

In addition to the numerous objects and advantages of the present invention described above, various other objects and advantages of the inert plastic coated flexible type diaphragm will become even more readily apparent to those persons who are specifically skilled in the flexible diaphragm type pump art from the following more detailed description of the instant invention, particularly, when such description is taken in conjunction with the attached drawing Figures and with the appended claims.

BRIEF DESCRIPTION OF THE DRAWINGS

FIG. 2 is a cross-sectional view of a presently preferred embodiment of an inert plastic coated flexible type diaphragm having an insert type member embedded therein, produced according to the present invention;

FIG. 3 is an enlarged fragmented view, in cross-section, of the inert plastic coated flexible type diaphragm having an insert type member embedded therein illustrated in FIG. 1;

FIG. 4 is a top view of a presently preferred embodiment of the insert type member which can be molded into the body portion of such inert plastic coated flexible type diaphragm;

FIG. 5 is a cross-sectional view of such insert type member which is taken along the lines V—V of FIG. 4; and FIG. 6 is an enlarged fragmented view of a presently preferred securing means disposed in the insert type member for securing the inert plastic coated flexible type diaphragm to a pump piston rod-like member.

Figure 1:
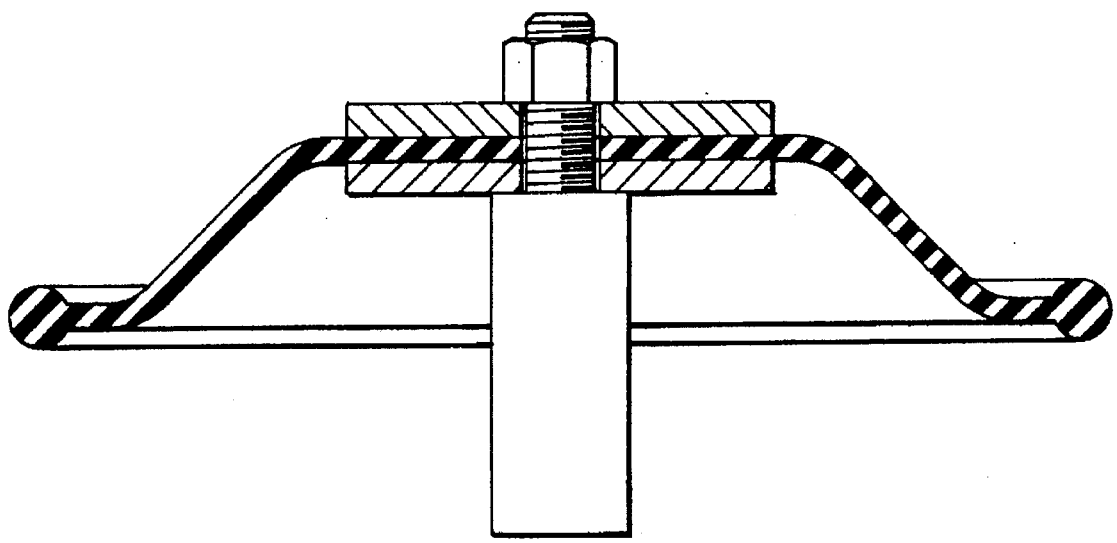
FIG. 1 is a cross-sectional view of a prior art type inert plastic coated flexible type diaphragm.

BRIEF DESCRIPTION OF THE PRESENTLY PREFERRED AND VARIOUS ALTERNATIVE EMBODIMENTS OF THE INVENTION

Prior to preceding to the much more detailed description of the present invention, it should be noted that, for the sake of clarity and understanding of the invention, identical components which have identical functions have been designated with identical reference numerals throughout the several views illustrated in the drawing Figures.

Reference is now directed, more particularly, to FIGS. 2 through 6 illustrated in the attached drawings. Shown therein is one presently preferred embodiment of an inert plastic coated flexible type diaphragm, generally designated 10, which can be used to advantage in a sanitary type pump application.

Such inert plastic coated flexible type diaphragm 10 includes a first body portion 12 disposed substantially in a center portion of the flexible type diaphragm 10. The first body portion 12 is relatively thick and exhibits a first degree of flexibility. Additionally, the first body portion 12 has a first predetermined shape.

A second body portion 14 of the inert plastic coated flexible type diaphragm 10 is formed contiguously with the first body portion 12 and extends around a periphery thereof. The second body portion 14 is relatively thin, when it is compared to such first body portion 12, and will exhibit a second degree of flexibility which is greater than the first degree of flexibility of the first body portion 12. Such second body portion 14 has a second predetermined shape.

There is a sealing means 16 formed contiguously with the second body portion 14 which extends around a periphery thereof. This sealing means 16 seals the flexible type diaphragm 10 in an operating position within a housing portion (not shown) of a pump (not shown). Such sealing means 16 has a third predetermined shape.

A preselected flexible type plastic layer 18 is adhered to each of the surfaces 20, 22 and 24, respectively, of such first body portion 12 and the second body portion 14 and such sealing means 16 which would otherwise come into intimate contact with a preselected type material to be pumped. This preselected flexible type plastic layer 18 exhibits a substantially uniform predetermined thickness.

Such preselected flexible type plastic layer 18 will, preferably, be selected from the group consisting of PEEK, Teflon, Viton, and various other ketone type based resins. Peek is the presently most preferred material for such use as the preselected flexible type plastic layer 18. Additionally, the substantially uniform predetermined thickness of such preselected flexible type plastic layer 18 will, preferably, be at least about 10 mils. On the other hand it should be noted that such preselected flexible type plastic layer 18 may be determined by such preselected type material to be pumped.

In the presently preferred embodiment of such inert plastic coated flexible type diaphragm 10, such preselected flexible type plastic layer 18 will be adhered to each of the respective surfaces 20, 22 and 24 of the first body portion 12 and the second body portion 14 and such sealing means 16 with a preselected adhesive. Although the present invention is not to be limited thereto, the presently most preferred adhesive for this application is Thixon 2000.

It should also be noted here that it is presently preferred that each of the respective surfaces 20, 22 and 24 of such first body portion 12 and such second body portion 14 and such sealing means 16 be roughened slightly prior to the application of the preselected adhesive thereto. These surfaces 20, 22 and 24 can be roughened to the degree required by sandblasting, for example.

In addition, each of the respective surfaces 20, 22 and 24 of the first body portion 12 and the second body portion 14 and such sealing means 16, preferably, will include an adhesive primer type coating disposed thereon prior to such application of the preselected adhesive thereto.

The first predetermined shape of such first body portion 12, in the presently most preferred embodiment of such inert plastic coated flexible type diaphragm 10, includes a convexly shaped first surface as such surface 20 of the first body portion 12 which will have such preselected flexible type plastic layer 18 adhesively adhered thereto and a substantially flat radially opposed second surface 26.

In the presently preferred embodiment of such inert plastic coated flexible type diaphragm 10, the second body portion 14 will exhibit a substantially uniform thickness. In addition, the second predetermined shape of such second body portion 14 formed contiguously with the first body portion 12 of such inert plastic coated flexible type diaphragm 10 includes both a substantially straight portion 28 and an arcuately shaped portion 30.

The third predetermined shape of such sealing means 16 formed contiguously with the second body portion 14 of such inert plastic coated flexible type diaphragm 10 exhibits a generally round cross section.

The final essential component of the inert plastic coated flexible type diaphragm 10 is an insert type member, generally designated 40. This insert type member 40 is adapted to be molded into the first body portion 12 of such inert plastic coated flexible type diaphragm 10. The insert type member 40 enables such preselected flexible type plastic layer 18, of such inert plastic coated flexible type diaphragm 10, to be a substantially uniform non-obtrusive surface area. This surface area will be positioned within such pump for intimate contact with the predetermined type material to be pumped.

Such insert type member 40 will include a first disc-like portion 46 having each of a first predetermined size and a first predetermined configuration. The insert type member 40 further includes a second disc-like portion 48 having each of a second predetermined size and a second predetermined configuration. This second disc-like portion 48 is secured to a first surface 50 of such first disc-like portion 46.

This second disc-like portion 48 extends from the first surface 50 of such first disc-like portion 46 for a predetermined distance. Preferably, this predetermined distance will be a distance which positions a surface 51 of such second disc-like portion 48 in substantially the same plane as the substantially flat radially opposed second surface 26 of such first body portion 12 of the inert plastic coated flexible diaphragm 10. In addition, such second disc-like portion 48 is preferably disposed substantially in a center portion of the first surface 50 of such first disc-like portion 46 of the insert type member 40.

In the presently most preferred embodiment of the invention, the first disc-like portion 46 will exhibit a generally round shape. Additionally, such first predetermined configuration of this first disc-like portion 46 will include a generally convex shaped second surface 52 which is disposed radially opposite the first surface 50. This first surface 50 of such first disc-like portion 46 will be a substantially flat surface.

Further, the peripheral surface 54 of such first disc-like portion 46 includes a radius type edge portion 56 that will be located adjacent at least one of the first surface 50 and such second surface 52. In the presently most preferred embodiment of the inert plastic coated flexible type diaphragm 10, such peripheral surface 54 of such first disc-like portion 46 includes such radius type edge portion 56 located adjacent each of such first surface 50 and the second surface 52.

In this embodiment of the insert type member 40, such second predetermined configuration of the second disc-like portion 48 will be an elongated and generally round shaped configuration. In addition, in the particular embodiment presently being described, such predetermined distance that the second disc-like portion 48 will extend from the first surface 50 of such first disc-like portion 46, of the insert type member 40, will generally be between at least about 0.25 inch and about 0.4 inch.

Additionally, this elongated and generally round second disc-like portion 48 of such insert type member 40 will, preferably, have a diameter that is generally between at least about 0.94 inch and about 1.06 inches.

The insert type member 40 further includes a plurality of apertures 58. The plurality of apertures 58 have a third predetermined size and a third predetermined configuration. Such plurality of apertures 58 are formed through such first disc-like portion 46 in order to provide an overall predetermined open area through such first disc-like portion 46 for receiving a rubber compound 60 therein and thereby significantly improve the bonding capability of the insert type member 40 to such inert plastic coated flexible type diaphragm 10 of such pump. In addition, this rubber compound 60 provides the mechanism which enables the insert type member 40 to resist being pulled out of the inert plastic coated flexible type diaphragm 10.

In a presently preferred embodiment of such insert type member 40 the third predetermined configuration of at least one of such plurality of such apertures 58 will exhibit a shape that is generally round. In the most preferred embodiment, of the invention, such third predetermined configuration of each of the plurality of such apertures 58 will exhibit a shape that is generally round.

Additionally, the diameter of each of these generally round apertures 58 will generally be in a range of between about 0.35 inch and about 0.4 inch. Further, in this insert type member 40, such overall predetermined open area provided by this plurality of such apertures 58 will generally be in the range of between about 10.0 percent and about 40.0 percent of the overall surface area of the convexly shaped second surface 52 of such first disc-like portion 46 of the insert type member 40. In the presently most preferred embodiment of such insert type member 40, the overall predetermined open area provided by this plurality of such apertures 58 will generally be in the range of between about 15.0 percent and about 25.0 percent of such overall surface area of the convexly shaped second surface 52 of such first disc-like portion 46 of the insert type member 40.

The final essential component of such insert type member 40 is a securing means, generally designated 70. Such securing means 70 is engageable at least with such second disc-like portion 48 for securing the insert type member 40 to an elongated piston rod-like member (not shown) which is disposed for reciprocal type movement within such pump.

In the presently preferred embodiment of such insert type member 40, such securing means 70 will at least include a threaded aperture portion 62. This threaded aperture portion 62 of the securing means 70 will be formed in at least the second disc-like portion 48 of the insert type member 40. As is clearly illustrated in FIGS. 4 and 5, it is even more preferred for such threaded aperture portion 62 of the securing means 70 to extend completely through such second disc-like portion 48 and into the first disc-like portion 46 of the insert type member 40.

Such insert type member 40, in accordance with the presently preferred embodiment of the invention, will be produced as an integral one piece type casting from a preselected material. Such preselected material is selected from the group consisting of metal and plastic. Preferably, such preselected material will be metal. Such metal is preferably cast iron.

It is also presently preferred that at least a portion surface area of such insert type member 40 will be abraded prior to molding into the first body portion 12 of such inert plastic coated flexible type diaphragm 10. Most preferably each surface of the insert type member 40 is abraded prior to molding into the first body portion 12. The abrading of each of such surfaces of the insert type member 40 is accomplished by at least one of sandblasting and chemically etching.

Furthermore, the insert type member 40, according to the presently preferred embodiment of the invention, will be coated with an adhesive layer 64 prior to molding into the first body portion 12 of the inert plastic coated flexible type diaphragm 10. The presently preferred adhesive layer 64 to be utilized in this application is Thixon 2000.

Such inert plastic coated flexible type diaphragm 10, in the presently preferred embodiment, further includes a preselected flexible type reinforcement layer 66 disposed beneath such each surface 20, 22 and 24 of the first body portion 12 and such second body portion 14 and the sealing means 16 which will come into intimate contact with such preselected type material to be pumped. Preferably, such preselected flexible type reinforcement layer 66 is nylon.

In the presently preferred embodiment of the invention, each surface of such insert type member 40 embedded within such first body portion 12 of the flexible type diaphragm 10 is roughened prior to assembly to improve adhesion. Additionally, each surface of the insert type member 40 embedded within such first body portion 12 of the flexible type diaphragm 10 will include a preselected adhesive type coating applied thereto prior to assembly. Such preselected adhesive type coating applied to such each surface of the insert type member 40 embedded within such first body portion 12 of the flexible type diaphragm 10 prior to such assembly is, preferably, Thixon 2000.

While a presently preferred and a number of alternative embodiments of the present invention have been described in detail above, it should be understood that various other adaptations and/or modifications of the inert plastic coated flexible type diaphragm may be envisioned by those persons who are skilled in the relevant art without departing from either the spirit of the invention or the scope of the appended claims.

I claim:

1. An inert plastic coated flexible type diaphragm for use in a sanitary type pump application, said inert plastic coated flexible type diaphragm comprising:

(a) a first body portion disposed substantially in a center portion of said inert plastic coated flexible type diaphragm, said first body portion being relatively thick and exhibiting a first degree of flexibility, said first body portion having a first predetermined shape;

(b) a second body portion formed contiguously with said first body portion and extending around a periphery thereof, said second body portion being relatively thin compared to said first body portion and exhibiting a second degree of flexibility which is greater than said first degree of flexibility, said second body portion having a second predetermined shape;

(c) a sealing means formed contiguously with said second body portion and extending around a periphery thereof for sealing said inert plastic coated flexible type diaphragm in an operating position within a housing portion of such pump, said sealing means having a third predetermined shape;

(d) a preselected flexible type plastic layer adhered to each surface of said first body portion and said second body portion and said sealing means which will come into intimate contact with a preselected type material to be pumped, said preselected flexible type plastic layer having a substantially uniform predetermined thickness; and (e) an insert type member embedded within said first body portion to enable said inert plastic coated flexible type diaphragm to be connected to a rod-like piston member disposed for reciprocal movement within such pump, said insert member including:

(i) a first disc-like portion, said first disc-like portion having both a first predetermined size and a first predetermined configuration, (ii) a second disc-like portion, said second disc-like portion having both a second predetermined size and a second predetermined configuration, said second disc-like portion being secured adjacent one surface thereof to a first surface of said first disc-like portion, said second disc-like portion extending from said first surface of said first disc-like portion for a predetermined distance and said second disc-like portion being disposed substantially in a center portion of said first surface of said first disc-like portion of said insert type member, (iii) a plurality of apertures formed through said first disc-like portion, said plurality of apertures having both a third predetermined size and a third predetermined configuration, said plurality of apertures providing an overall predetermined open area through said first disc-like portion for receiving a preselected rubber compound therein and thereby significantly improve bonding of said insert type member to said first body portion of said inert plastic coated flexible type diaphragm, and (iv) a securing means engageable at least with said second disc-like portion for securing said insert type member to such rod-like piston member.

2. An inert plastic coated flexible type diaphragm, according to claim 1, wherein said inert plastic coated flexible type diaphragm further includes a preselected flexible type reinforcement layer disposed beneath said each surface of said first body portion and said second body portion and said sealing means which will come into intimate contact with such preselected type material to be pumped.

3. An inert plastic coated flexible type diaphragm, according to claim 2, wherein said preselected flexible type reinforcement layer is nylon.

4. An inert plastic coated flexible type diaphragm, according to claim 1, wherein said preselected flexible type plastic layer is adhered to said each surface of said first body portion and said second body portion and said sealing means with a preselected adhesive.

5. An inert plastic coated flexible type diaphragm, according to claim 4, wherein said preselected adhesive is Thixon 2000.

6. An inert plastic coated flexible type diaphragm, according to claim 4, wherein said each surface of said first body portion and said second body portion and said sealing means is roughened prior to application of said preselected adhesive thereto.

7. An inert plastic coated flexible type diaphragm, according to claim 6, wherein said each surface of said first body portion and said second body portion and said sealing means includes an adhesive primer type coating disposed thereon prior to said application of said preselected adhesive thereto.

8. An inert plastic coated flexible type diaphragm, according to claim 1, wherein said preselected flexible type plastic layer is selected from the group consisting of PEEK, Teflon, Viton, and various other ketone based resins.

9. An inert plastic coated flexible type diaphragm, according to claim 8, wherein said preselected flexible type plastic layer is PEEK.

10. An inert plastic coated flexible type diaphragm, according to claim 1, wherein said substantially uniform predetermined thickness of said preselected flexible type plastic layer is at least about 10 mils.

11. An inert plastic coated flexible type diaphragm, according to claim 1, wherein said first predetermined shape of said first body portion includes a convexly shaped first surface as said surface of said first body portion having said preselected flexible type plastic layer adhered thereto and a substantially flat radially opposed second surface.

12. An inert plastic coated flexible type diaphragm, according to claim 1, wherein said second body portion exhibits a substantially uniform thickness and said second predetermined shape of said second body portion formed contiguously with said first body portion of said inert plastic coated flexible type diaphragm includes both a substantially straight portion and an arcuately shaped portion.

13. An inert plastic coated flexible type diaphragm, according to claim 1, wherein said third predetermined shape of said sealing means formed contiguously with said second body portion of said inert plastic coated flexible type diaphragm exhibits a generally round cross section.

14. An inert plastic coated flexible type diaphragm, according to claim 1, wherein each surface of said insert type member embedded within said first body portion of said inert plastic coated flexible type diaphragm is roughened prior to assembly to improve adhesion.

15. An inert plastic coated flexible type diaphragm, according to claim 14, wherein said each surface of said insert type member embedded within said first body portion of said inert plastic coated flexible type diaphragm includes a preselected adhesive type coating applied thereto prior to said assembly.

16. An inert plastic coated flexible type diaphragm, according to claim 15, wherein said preselected adhesive type coating applied to said each surface of said insert type member embedded within said first body portion of said inert plastic coated flexible type diaphragm prior to said assembly is Thixon 2000.

17. An inert plastic coated flexible type diaphragm, according to claim 1, wherein said preselected flexible type plastic layer is determined by such preselected type material to be pumped.

18. An inert plastic coated flexible type diaphragm, according to claim 1, wherein said overall predetermined open area provided by said plurality of said apertures formed through said first disc-like portion is generally in a range of between about 10.0 percent and about 40.0 percent of an overall surface area of a convexly shaped surface of said first disc-like portion of said insert type member.

19. An inert plastic coated flexible type diaphragm, according to claim 18, wherein said overall predetermined open area provided by said plurality of said apertures formed through said first disc-like portion is generally in a range of between about 15.0 percent and about 25.0 percent of said overall surface area of said convexly shaped surface of said first disc-like portion of said insert type member.

20. An inert plastic coated flexible type diaphragm, according to claim 18, wherein said insert type member is manufactured as an integral one piece type casting from a preselected material.

21. An inert plastic coated flexible type diaphragm, according to claim 20, wherein said preselected material utilized to produce such insert type member is selected from the group consisting of metal and plastic.

* * * * *